United States Patent [19]
Davis, Jr.

[11] Patent Number: 4,926,777
[45] Date of Patent: May 22, 1990

[54] AQUATIC WHEELCHAIR

[76] Inventor: Frederick B. Davis, Jr., 21 Deer Creek Rd., Ketchum, Id. 83340

[21] Appl. No.: 265,812

[22] Filed: Nov. 1, 1988

[51] Int. Cl.⁵ .................. B63B 35/02; B63H 16/00
[52] U.S. Cl. ...................... 114/270; 297/DIG. 4; 440/21; 440/90; 440/100; 280/250.1
[58] Field of Search .............. 440/21, 90, 98, 100, 440/26, 27; 280/250.1; 114/270; 297/DIG. 4

[56] References Cited

U.S. PATENT DOCUMENTS

| | | | |
|---|---|---|---|
| 1,104,229 | 7/1914 | Szegel | 440/100 X |
| 2,896,693 | 7/1959 | Schladebach | 280/250.1 X |
| 2,998,798 | 9/1961 | Love | 440/90 X |
| 3,298,348 | 1/1967 | Sanders | 440/100 |
| 3,611,978 | 10/1971 | Gray | 114/270 |

FOREIGN PATENT DOCUMENTS 743630 4/1933 France ..................... 114/270

Primary Examiner—Sherman D. Basinger
Attorney, Agent, or Firm—Brady, O'Boyle & Gates

[57] ABSTRACT

An aquatic wheelchair having a main flotation body of thermoplastic material of closed cell construction including a seat portion and an integral backrest portion. Flotation paddle wheels are connected to the seat portion and a flotation stabilizer wheel assembly is detachably connected to the backrest portion. The flotation paddle wheels are constructed and arranged to facilitate the grasping thereof by the user for manually propelling the wheelchair not only on soft terrain but also in water.

20 Claims, 2 Drawing Sheets

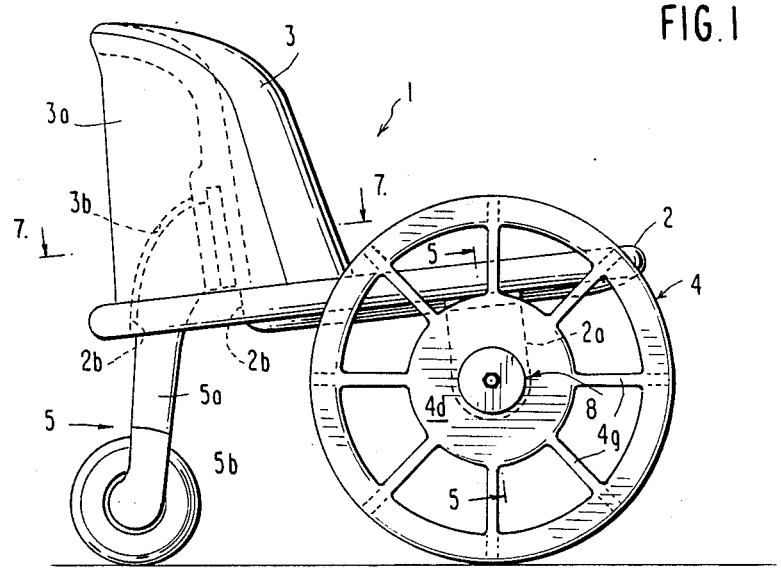
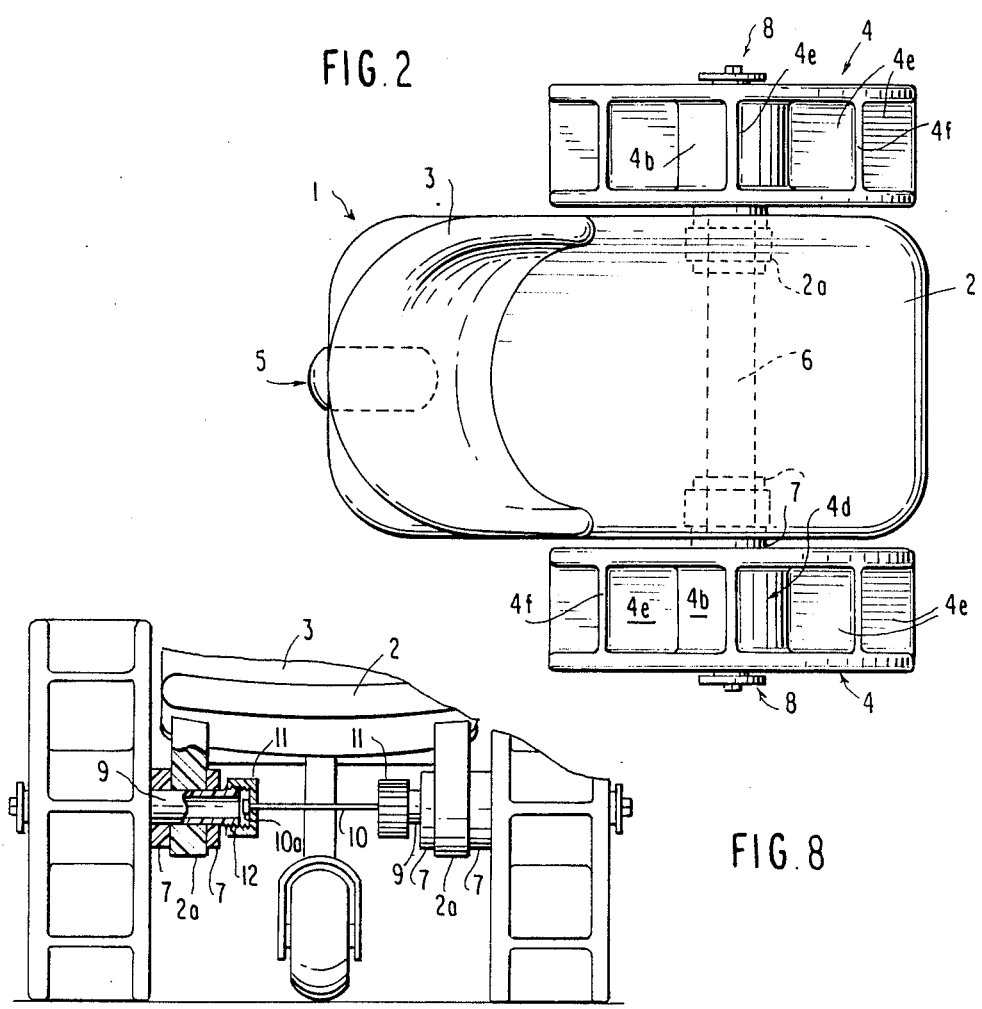

AQUATIC WHEELCHAIR

BACKGROUND OF THE INVENTION

Many victims of injury to the brain or spinal cord are left paralyzed and in need of care so that they can continue to live active and productive lives. It was reported in 1988, that the National Institute on Disability and Rehabilitation Research estimated that in the United States alone, there were 300,000 wheelchair-bound paraplegics and quadriplegics; many of whom keep physically active by playing various sports; such as, tennis and basketball, while in their wheelchairs.

In order that wheelchair-bound persons may expand their activity to aquatic recreation and aquatic sports, such as, water polo, after considerable research and experimentation, the aquatic wheelchair of the present invention has been devised which comprises, essentially, a main flotation body having a seat portion and a backrest portion, flotation paddle wheels are mounted on the seat portion on each side thereof, and a flotation stabilizer wheel is detachably connected to the backrest portion. The flotation paddle wheels are constructed and arranged to facilitate the convenient grasping of the top portions of the paddle portions of the paddle wheels by the user when seated for manually propelling the wheelchair not only on soft terrain, such as a sandy beach or grass areas, but also in water, such as a pool, lake, bay or ocean.

BRIEF DESCRIPTION OF THE DRAWINGS

FIG. 1 is a side elevational view of the aquatic wheelchair of the present invention;

FIG. 2 is a top plan view of the aquatic wheelchair;

FIG. 8 is an elevational view of another embodiment of an axle assembly to be employed in the aquatic wheelchair of the present invention.

DESCRIPTION OF THE PREFERRED EMBODIMENT

Figure 3:
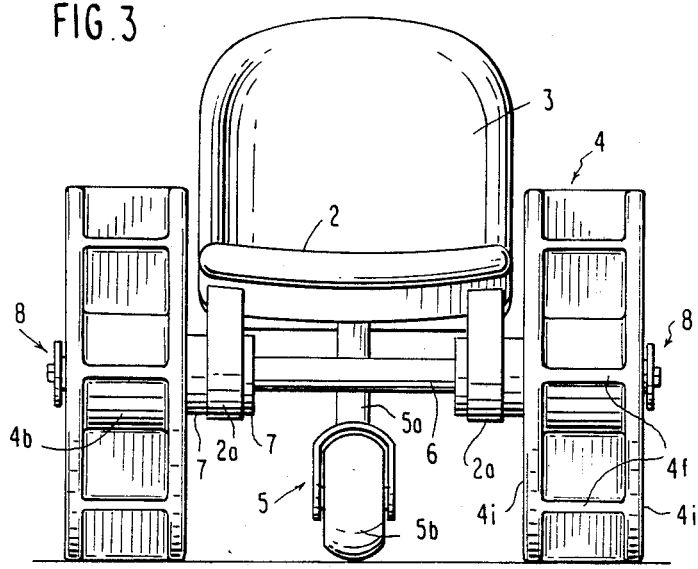
FIG. 3 is a front elevational view of the aquatic wheelchair.

Referring to the drawings and more particularly to FIGS. 1 and 2, the aquatic wheelchair of the present invention comprises a main flotation body 1 having a seat portion 2 and an integral backrest portion 3. Flotation paddle wheels 4 are connected to the seat portion 2 on each side thereof, and a flotation stabilizer wheel assembly 5 is detachably connected to the backrest portion 3. The seat 2 and backrest 3 are formed of lightweight polystyrene or other suitable thermoplastic material of closed cell construction, and as will be seen in FIGS. 2 and 3, they are each curved or formed with a concave configuration to enhance the comfort of the occupant.

Figures 5, 6:
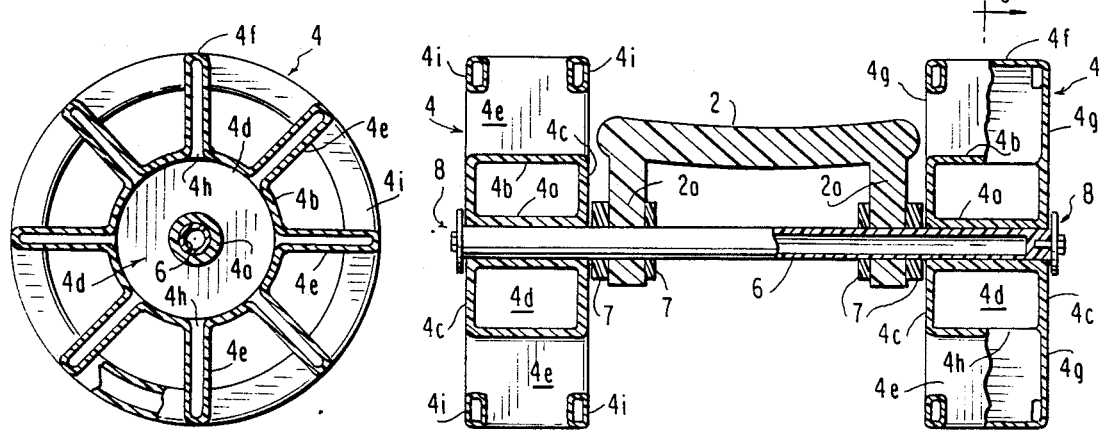
FIG. 5 is a view taken along line 5—5 of FIG. 1.
FIG. 6 is a view taken along line 6—6 of FIG. 5.

Referring to FIG. 5, it will be seen that the paddle wheels 4 are rotatably mounted on a tubular axle 6 extending transversely of the seat and extending through depending hangers 2a integrally formed with the seat.

The axle 6 is provided with suitable washers 7 positioned and secured on each side of the hangers 2a to reinforce the same and secure the axle 6 thereto, and the outer washers act as spacers for the paddle wheels. The axle 6 is hollow with sealed ends and is therefore buoyant, and a washer and bolt assembly 8 on each end thereof maintains the paddle wheels 4 on the axle 6.

The details of the construction of the paddle wheels 4 which are molded of plastics material are illustrated in FIGS. 5 and 6. Each paddle wheel comprises an inner hub portion 4a surrounding the axle 6 and forming the bearing for the wheel. An outer hub portion 4b is spaced radially outwardly from the hub portion 4a, and the inner and outer hub portions 4a and 4b are connected by end walls 4c, to thereby form an annular flotation chamber 4d. A plurality of circumferentially spaced, radially extending spokes 4e are formed integral with the outer hub portion 4b, the spokes being hollow with their outer ends being closed as at 4f and their sides being closed by end walls 4g. The inner ends of the spokes 4e communicate with the annular flotation chamber 4d, as at 4h, whereby the flotation of the wheel is enhanced. In order to reinforce the spokes 4e and to provide ground engaging surfaces in addition to those shown at 4f to facilitate propelling the wheelchair on terrain, incl. soft terrain, the outer ends of the spokes 4e are interconnected by a pair of laterally spaced tubular rings 4i. Experimentation has shown, for example, and not by way of limitation, that an efficiently operating paddle wheel providing the proper amount of buoyancy and thrust, can have a diameter of approximately two feet, a width of approximately eight inches, with the width of each of the ground engaging surfaces of the pair of laterally spaced tubular rings 4i being approximately two inches. The diameter of the annular flotation chamber 4d in such a paddle wheel is approximately thirteen inches. It is preferred that each paddle wheel, for example, has eight spokes. With a wheel having the dimensions given by way of example, each paddle wheel will have approximately 304 square inches of thrusting surface. By way of comparison, a large canoe paddle has approximately 105 square inches of thrusting surface. The two paddle wheels will have more thrusting surface than six canoe paddles, so that the occupant of the chair can propel himself or herself forwardly in the water with ease.

Referring to FIG. 1, it will be noted that the construction and arrangement of the paddle wheels 4 relative to the seat portion 2 and backrest portion 3 are such that the wheels 4 are mounted forwardly of the seat and backrest portions, for example, by approximately sixteen inches, to thereby position them for ease of grasping by the occupant of the chair, and by determining the center of gravity, so that the main flotation body 1 will remain in a stabilized position while in the water, the seat portion 2 is inclined upwardly in a direction from the back of the chair toward the front. With the paddle wheels positioned in this manner, the tops of the wheels can become armrests for the occupant when the chair is at rest. The tops of the wheels are at the proper height, so that for propelling the chair forwardly, when floating in the water, the occupant grasps the closed outer ends 4f, that is the top portions, of the spokes 4e with the hands, with the heel portion of the palms bearing against one surface of the spokes and the fingers extending around the closed ends 4f, and by pushing forwardly with the arms the paddle wheels are rotated toward the front of the chair. An occupant who has use of his arms, but not of his fingers, can also propel the chair forwardly, and maneuver the chair in the water, such as by rotating only one wheel for turning the chair.

Figure 7:
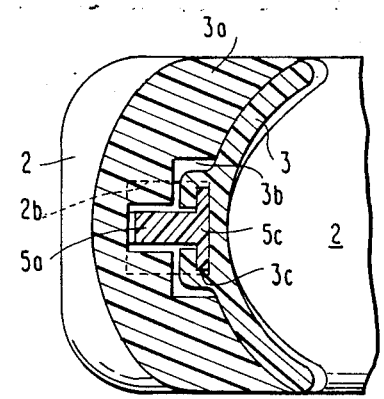
FIG. 7 is a view taken along line 7—7 of FIG. 1.
Figure 4:
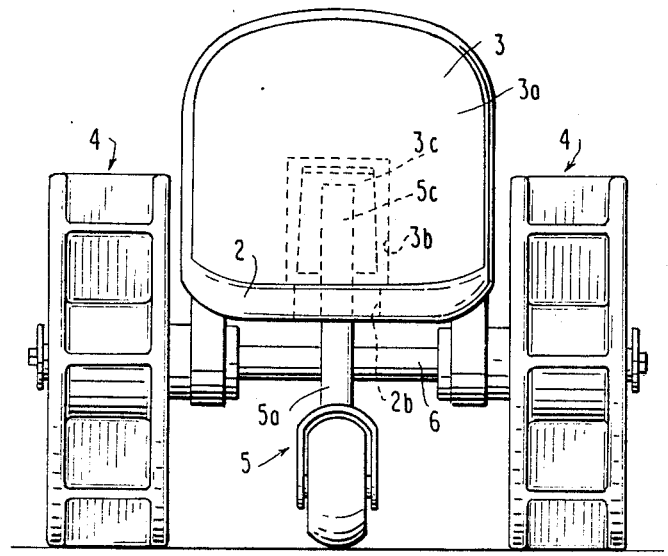
FIG. 4 is a rear elevational view of the aquatic wheelchair.

In order that the wheelchair will be stabilized while being propelled on the ground, the stabilizer flotation wheel assembly 5 is provided, the details of which are illustrated in FIGS. 1, 4 and 7. The wheel assembly 5 comprises, a leg or pedestal 5a having a hollow balloon-type wheel 5b rotatably mounted on its lower end. The pedestal 5a, preferably formed from thermoplastic material of closed cell construction, is centered on the longitudinal axis of the seat portion 2 and extends upwardly through an opening 2b provided in the rear of the seat portion 2, and into a communicating passage 3b provided in a curved backrest flotation extension 3a connected to the rear of the backrest 3 and the seat portion 2 behind the backrest 3 to provide additional flotation. The backrest flotation extension 3a is also formed from thermoplastic material of closed cell construction. The upper end of the pedestal 5a is terminated by a tongue 5c which is slidably mounted in a groove 3c provided in the back wall of the backrest 3. The tongue connector 5c and groove 3c may be correspondingly tapered to removably retain pedestal 5a in connection with the backrest 3. As an alternative, a removable pin, not shown, can be used to removably retain the wheel assembly 5 on the chair. The removable pin, for example, could extend through the rear edge of seat portion 2, into the opening 2b, and into the pedestal 5a. By this construction and arrangement, the wheel assembly 5 can be detachably connected to the main flotation body for purposes of storage or transportation.

While the embodiment of the wheelchair as shown in FIGS. 1 to 6 employs a hollow, tubular axle 6 which enhances the overall flotation characteristics of the aquatic wheelchair, FIG. 8 illustrates another embodiment of an axle assembly wherein the paddle wheels 4 are rotatably mounted on stub shafts 9 secured to the hangers 2a. To maintain the lateral stability of the chair, a plastic coated multi-strand tension cable 10 of steel or the like is provided. The end portions of the cable extend through a pair of apertured end caps 11 threadably mounted on the receptive threaded end 12 of the stub shaft 9, the ends of the cable 10 being enlarged as at 10a to prevent their removal from the apertured caps. By reducing the dimensions of the axle assembly, the flow resistance of the chair while being propelled in water is also reduced. Additional tensioning of the cable is provided by threading end caps 11 further onto the threaded ends 12 of the stub shafts.

From the above description it will be readily apparent that the aquatic wheelchair of the present invention provides an improved aquatic vehicle, whereby wheelchair bound persons may expand their activity to aquatic sports and aquatic recreation, incl. fishing. The flotation of the wheelchair is enhanced by the lightweight buoyant material of the main flotation body 1, including seat portion 2, backrest 3 and backrest flotation extension 3a; and the pedestal 5a, together with the hollow stabilizer wheel 5b and the various hollow portions of the paddle wheels 4.

The terms and expressions which have been employed herein are used as terms of description and not of limitation, and there is no intention in the use of such terms and expressions, of excluding any equivalents of the features shown and described, or portions thereof, but it is recognized that various modifications are possible within the scope of the invention claimed.

I claim:

1. An aquatic wheelchair comprising, a main flotation body having a seat portion and a backrest portion, a pair of flotation paddle wheels having upper circumference portions, means connecting said pair of paddle wheels underneath said seat portion in proximity to and rearwardly of the front of the seat portion, a flotation stabilizer wheel assembly, means connecting the stabilizer wheel assembly to the backrest portion, said pair of paddle wheels each having a radius positioning the upper circumference portion thereof above said seat portion in a horizontal plane tangent to said circumference portion and intersecting said backrest portion at a medical portion of the height of said backrest portion, and said upper circumference portion positioned rearwardly of the front of said seat portion and forwardly of said backrest portion, whereby an occupant of the chair can grasp the upper circumference portion of the paddle wheels for manually propelling the wheelchair not only on soft terrain but also in the water.

2. An aquatic wheelchair according to claim 1, wherein the main flotation body portion is formed from thermoplastic material of closed cell construction.

3. An aquatic wheelchair according to claim 1, wherein each flotation paddle wheel comprises an inner hub portion, an outer hub portion spaced radially outwardly from said inner hub portion, end walls extending between said inner and outer hub portions, to thereby form an annular flotation chamber, a plurality of circumferentially spaced, radially extending, hollow spokes connected to the outer hub portion, each spoke being closed at its outer end and on its sides, the inner end of each spoke being open and communicating with said annular flotation chamber, whereby the flotation of the wheel is enhanced.

4. An aquatic wheelchair according to claim 1, wherein the flotation stabilizer wheel assembly comprises a pedestal, and a hollow wheel rotatably mounted on the lower end thereof.

5. An aquatic wheelchair according to claim 4, wherein the pedestal is formed from thermoplastic material of closed cell construction.

6. An aquatic wheelchair comprising, a main flotation body having a seat portion and a backrest portion, a pair of flotation paddle wheels, means connecting said pair of paddle wheels to said seat portion on each side thereof in proximity to the front of the seat portion, each of said flotation paddle wheels comprising an inner hub portion, an outer hub portion spaced radially outwardly from said inner hub portion, end walls extending between said inner and outer hub portions, to thereby form an annular flotation chamber, a plurality of circumferentially spaced, radially extending, hollow spokes connected to the outer hub portion, each spoke being closed at its outer end and on its sides, a pair of laterally spaced tubular ring portions connected to the outer ends of said spokes, whereby an occupant of the chair can grasp the outer ends of the spokes between the pair of laterally spaced tubular ring portions for manually propelling the wheelchair in the water and on terrain.

7. An aquatic wheelchair according to claim 6, including a backrest flotation extension connected on the opposite side of said backrest portion from said pair of flotation paddle wheels.

8. An aquatic wheelchair according to claim 6, in which said seat portion extends rearwardly of said backrest portion, a backrest flotation extension connected to the rearward extension of said seat portion and to the rear of said backrest portion, whereby the weight of an occupant of the chair floating in water is balanced by said backrest flotation extension, said backrest, said seat portion and said pair of flotation paddle wheels.

9. An aquatic wheelchair according to claim 8, wherein said main flotation body and said backrest flotation extension are formed of thermoplastic material of closed cell construction.

10. An aquatic wheelchair according to claim 6, in which said pair of laterally spaced tubular ring portions having ground engaging surface portions forming the circumference of the paddle wheel, and said closed outer ends of the spokes also forming ground engaging surface portions for the paddle wheel.

11. An aquatic wheelchair according to claim 10, in which said ground engaging surface portions of said pair of laterally spaced tubular ring portions and said closed outer ends of the spokes lying in the same cylindrical plane of the paddle wheel.

12. An aquatic wheelchair according to claim 6, including flotation stabilizer wheel assembly, and means connecting said stabilizer wheel assembly to said backrest portion.

13. An aquatic wheelchair according to claim 12, in which said seat portion includes a rear extension extending rearwardly of said backrest portion, an opening through said rear extension of said seat portion, and said flotation stabilizer wheel assembly extending through said opening into connection with said backrest portion.

14. An aquatic wheelchair according to claim 13, including a backrest flotation extension connected to said rear extension of said seat portion and to the rear of said backrest portion.

15. An aquatic wheelchair comprising, a main flotation body having a seat portion and a backrest portion, a pair of flotation paddle wheels, means connecting said pair of paddle wheels to said seat portion on each side thereof in proximity to the front of the seat portion, each flotation paddle wheel of said pair of paddle wheels comprises an inner hub portion, an outer hub portion, spaced radially outwardly from said inner hub portion, end walls extending between said inner and outer hub portions, to thereby form an annular flotation chamber, a plurality of circumferentially spaced, radially, extending, hollow spokes connected to the outer hub portion, each spoke being closed at its outer end and on its sides, a pair of laterally spaced tubular ring portions connected to the outer ends of said spokes to reinforce the spokes, the inner end of each spoke being open and communicating with said annular flotation chamber to enhance the flotation of the wheel, a flotation stabilizer wheel assembly, means connecting the stabilize wheel assembly to the backrest portion, whereby an occupant of the chair can grasp the paddle wheels for manually propelling the wheel chair not only on soft terrain but also in the water.

16. An aquatic wheelchair comprising, a main flotation body having a seat portion and a backrest portion, a pair of flotation paddle wheels, a pair of depending hangers connected to said seat portion on each side thereof in proximity to the front of the seat portion for connecting said pair of paddle wheels on each side of the seat portion, transverse axle means extending through said depending hangers, each flotation paddle wheel of said pair of paddle wheels comprises an inner hub portion rotatably mounted on said axle means, an outer hub portion spaced radially outwardly from said inner hub portion, end walls extending between said inner and outer hub portions, to thereby form an annular flotation chamber, a plurality of circumferentially spaced, radially extending, hollow spokes connected to the outer hub portion, each spoke being closed at its outer end and on its sides, the inner end of each spoke being open and communicating with said annular flotation chamber to enhance the flotation of the wheel, a flotation stabilizer wheel assembly, means connecting the stabilizer wheel assembly to the backrest portion, whereby an occupant of the chair can grasp the paddle wheels for manually propelling the wheelchair not only on soft terrain but also in the water.

17. An aquatic wheelchair according to claim 16, wherein the axle means comprises a tubular axle extending transversely of the seat through said hangers.

18. An aquatic wheelchair according to claim 16, wherein the axle means comprises, a stub shaft connected to each hanger, a threaded end on each stub shaft, a cap threadably mounted to each stub shaft, and a tension cable extending between said caps, each end of said tension cable being connected to a respective cap.

19. An aquatic wheelchair according to claim 16, wherein the seat portion is inclined upwardly in a direction from the back of the chair toward the front, whereby the main flotation body remains in a stabilized position while in water.

20. An aquatic wheelchair comprising, a main flotation body having a seat portion and a backrest portion, a pair of flotation paddle wheels, means connecting said pair of paddle wheels to said seat portion on each side thereof in proximity to the front of the seat portion, a flotation stabilizer wheel assembly including a pedestal, a hollow wheel rotatably mounted on the lower end of the pedestal, said backrest portion having a back wall portion, a tongue provided on the upper end of said pedestal, a groove provided in the back wall portion of the backrest, said tongue being slidably mounted in said groove, whereby the stabilizer wheel assembly is detachably connected to the main flotation body to thereby facilitate the transportation and storage of the wheelchair and an occupant of the chair can grasp the paddle wheels for manually propelling the wheelchair not only on soft terrain but also in the water.

* * * * *